United States Patent
Xu et al.

(10) Patent No.: US 9,083,465 B2
(45) Date of Patent: Jul. 14, 2015

(54) METHOD FOR ACQUIRING PON PORT ASSOCIATION RELATIONSHIP, OPTICAL NETWORK DEVICE, AND OPTICAL NETWORK SYSTEM

(71) Applicant: HUAWEI TECHNOLOGIES CO., LTD., Shenzhen (CN)

(72) Inventors: Weiping Xu, Shenzhen (CN); Hongyu Li, Shenzhen (CN); Frank J. Effenberger, Colts Neck, NJ (US)

(73) Assignee: HUAWEI TECHNOLGIES CO., LTD., Shenzhen (CN)

( * ) Notice: Subject to any disclaimer, the term of this patent is extended or adjusted under 35 U.S.C. 154(b) by 49 days.

(21) Appl. No.: 14/146,966

(22) Filed: Jan. 3, 2014

(65) Prior Publication Data

US 2014/0178074 A1 Jun. 26, 2014

Related U.S. Application Data

(63) Continuation of application No. PCT/CN2012/074676, filed on Apr. 25, 2012.

(30) Foreign Application Priority Data

Jul. 4, 2011 (CN) .......................... 2011 1 0185468

(51) Int. Cl.
*H04J 14/08* (2006.01)
*H04B 10/03* (2013.01)
(Continued)

(52) U.S. Cl.
CPC ................ *H04B 10/27* (2013.01); *H04B 10/03* (2013.01); *H04B 10/032* (2013.01);
(Continued)

(58) Field of Classification Search
CPC .. H04B 10/03–10/0799; H04B 10/27–10/272; H04Q 11/0067; H04J 14/08

USPC ................................. 398/1–8, 58–75, 98–102
See application file for complete search history.

(56) References Cited

U.S. PATENT DOCUMENTS 7,272,137 B2 * 9/2007 Unitt et al. .................... 370/389
7,860,121 B2 * 12/2010 Chen ............................ 370/432
(Continued)

FOREIGN PATENT DOCUMENTS

| CN | 101150367 A | 3/2008 |
| CN | 101547045 A | 9/2009 |
| CN | 101895791 A | 11/2010 |

OTHER PUBLICATIONS

Extended European Search Report issued on Jul. 29, 2014 in corresponding European Patent Application No. 12 792 561.8.
(Continued)

*Primary Examiner* — Li Liu
(74) *Attorney, Agent, or Firm* — Staas & Halsey LLP (57) ABSTRACT

The present invention discloses a method for acquiring a PON port association relationship. An OLT where a standby PON port is located receives a protection packet from an optical network unit, parses the protection packet to obtain an identifier of an active PON port carried in the packet, and acquires an association relationship between the active PON port and the standby PON port according to an identifier of the standby PON port receiving the protection packet. When the present invention is implemented, the OLT where the standby PON port is located can acquire an association relationship between an active PON port and a standby PON port, and determine, according to the association relationship, whether the protection packet is valid or acquire, according to the association relationship, configuration information of the active PON port.

14 Claims, 3 Drawing Sheets

(51) Int. Cl.
*H04B 10/272* (2013.01)
*H04B 10/27* (2013.01)
*H04B 10/032* (2013.01)
*H04Q 11/00* (2006.01)
*H04L 12/24* (2006.01)
H04L 12/707 (2013.01)
H04L 12/703 (2013.01)

(52) U.S. Cl.
CPC .............. *H04B 10/272* (2013.01); *H04J 14/08* (2013.01); *H04L 41/0816* (2013.01); *H04L 41/12* (2013.01); *H04Q 11/0067* (2013.01); *H04L 45/22* (2013.01); *H04L 45/28* (2013.01); *H04Q 2011/009* (2013.01); *H04Q 2011/0081* (2013.01); *H04Q 2011/0088* (2013.01)

(56) References Cited

U.S. PATENT DOCUMENTS

| | | | | |
|---|---|---|---|---|
| 7,876,749 | B1* | 1/2011 | Figueira et al. | 370/389 |
| 8,755,685 | B2* | 6/2014 | Zheng et al. | 398/2 |
| 2005/0002386 | A1* | 1/2005 | Shiragaki | 370/380 |
| 2007/0047959 | A1* | 3/2007 | Thomas et al. | 398/72 |
| 2007/0274720 | A1 | 11/2007 | Menasco et al. | |
| 2011/0142448 | A1* | 6/2011 | Zou | 398/58 |
| 2011/0188512 | A1* | 8/2011 | Figueira et al. | 370/419 |
| 2011/0200331 | A1* | 8/2011 | Li et al. | 398/45 |
| 2012/0045199 | A1* | 2/2012 | Sun et al. | 398/5 |
| 2013/0101283 | A1* | 4/2013 | Zheng | 398/2 |
| 2014/0099097 | A1* | 4/2014 | Zheng | 398/5 |

OTHER PUBLICATIONS

Xu D. J. et al: "Proposal of a new protection mechanism for ATM PON interface", ICC 2011. 2001 IEEE International Conference on Communications. Conference Record. Helsinky, Finland, Jun. 11-14, 2001; [IEEE International Conference on Communications], New York, NY : IEEE, US, vol. 7, Jun. 11, 2001, pp. 2160-2165, XP010553700.

"Recommendation ITU-T G.984.1: Gigabit-capable passive optical networks (GPON): General Characteristics," *ITU-T 6984.1 Series G: Transmission Systems and Media, Digital Systems and Networks Digital sections and digital line system—Optical line systems for local and access networks*, Mar. 29, 2008, pp. i-iii; 1-33, International Telecommunication Union.

International Search Report issued Jul. 19, 2012, in corresponding International Patent Application No. PCT/CN2012/074676.

* cited by examiner

METHOD FOR ACQUIRING PON PORT ASSOCIATION RELATIONSHIP, OPTICAL NETWORK DEVICE, AND OPTICAL NETWORK SYSTEM

CROSS-REFERENCE TO RELATED APPLICATIONS

This application is a continuation of International Application No. PCT/CN2012/074676, filed on Apr. 25, 2012, which claims priority to Chinese Patent Application No. 201110185468.9, filed on Jul. 4, 2011, both of which are hereby incorporated by reference in their entireties.

TECHNICAL FIELD

Embodiments of the present invention relate to the field of communication technologies, and in particular to a method for acquiring a PON port association relationship, an optical network device, and an optical network system.

BACKGROUND

A passive optical network (Passive Optical Network, PON) is a point-to-multipoint optical access technology. The PON includes an optical line terminal (Optical Line Terminal, OLT), an optical splitter (Optical Splitter), an optical network unit (Optical Network Unit, ONU), and a fiber connecting these devices. The OLT is connected to the optical splitter through a trunk fiber, and the optical splitter is connected to each ONU through a plurality of branch fibers.

To ensure that a service of the ONU is not interrupted after the trunk fiber between the OLT and the optical splitter is faulty, an active optical link and a standby optical link may be established between the optical splitter and the OLT, so that the service may be switched to the standby optical link when the active optical link is faulty.

Figure 1:
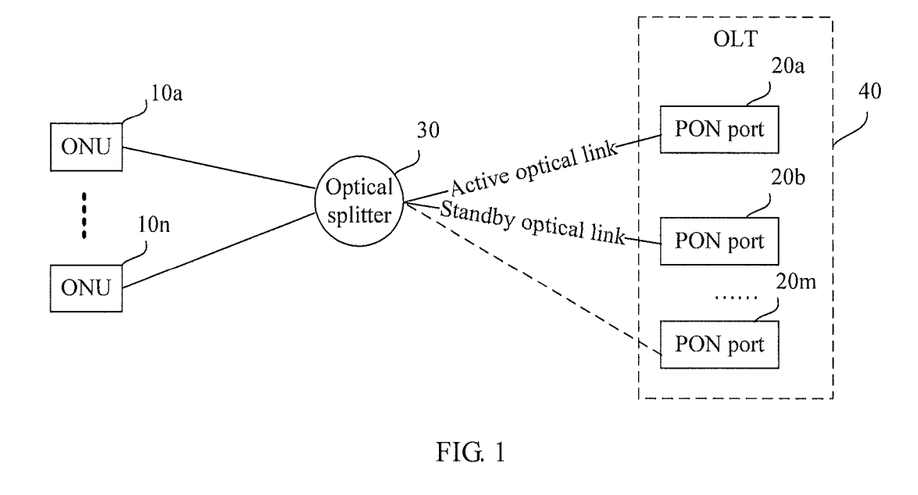
FIG. 1 is a schematic diagram of a networking structure of a standby optical link in the prior art.

FIG. 1 illustrates a networking scheme of a standby optical link in the prior art. In FIG. 1, a PON port 20a and a PON port 20b work in mutual backup mode; ONU 10a to ONU 10n are connected to an optical splitter 30 through branch fibers; the optical splitter 30 is connected to the PON port 20a through the active optical link and is connected to the PON port 20b through the standby optical link; and the PON port 20a and the PON port 20b may belong to a same OLT or different OLTs.

Currently, during a line construction, a builder lays a fiber between the optical splitter 30 and a PON port, and a network administrator configures information for the PON port. Because these two operations are two independent processes, a case that a standby fiber is connected to an inappropriate standby PON port easily occurs. In the prior art, the OLT device connected to the standby fiber cannot acquire an association relationship between the active PON port and the standby PON port, and therefore cannot detect whether the standby fiber is incorrectly connected when the active PON port works normally. Assuming that the PON port 20a and the PON port 20b are configured to work in mutual backup mode, if the builder incorrectly connects the standby optical link to another PON port, for example, a PON port 20m, the standby optical link cannot function normally because the PON port 20m does not have the same configuration information as the PON port 20a.

SUMMARY

Embodiments of the present invention provide a method for acquiring a PON port association relationship, an optical network device, and an optical network system, which are used to acquire a PON port association relationship automatically after a PON port establishes a connection with an optical splitter, so as to avoid a configuration error caused by incorrect manual operations during configuration of a standby link, improve configuration efficiency, and prevent a malicious attack initiated by an ONU.

In one aspect, an embodiment of the present invention provides a method for acquiring a PON port association relationship, including: receiving, through a standby PON port, a protection packet that carries a port identifier of an active PON port from an optical network unit ONU; parsing the protection packet to obtain the port identifier of the active PON port carried in the protection packet; and acquiring an association relationship between the active PON port and the standby PON port according to a port identifier of the standby PON port receiving the protection packet.

In another aspect, an embodiment of the present invention provides an optical network device, including: a receiver, configured to receive, through a standby PON port, a protection packet that carries a port identifier of an active PON port from an optical network unit ONU; a parsing unit, configured to parse the protection packet received by the receiver to obtain the port identifier of the active PON port carried in the protection packet; and an acquiring unit, configured to acquire an association relationship between the active PON port and the standby PON port according to a port identifier of the standby PON port receiving the protection packet.

In another aspect, an embodiment of the present invention provides an optical network system, including an optical network unit ONU and a first optical line terminal OLT, where: the ONU is configured to send a protection packet that carries a port identifier of an active PON port to the first OLT; and the first OLT is configured to receive the protection packet through a standby PON port, parse the protection packet to obtain the port identifier of the active PON port carried in the protection packet, and acquire an association relationship between the active PON port and the standby PON port according to the port identifier of the standby PON port receiving the protection packet.

In the foregoing embodiments of the present invention, when an OLT where a standby PON port is located receives, through the standby PON port, a packet from an ONU, the OLT acquires an association relationship between an active PON port and the standby PON port, and can perform subsequent processing according to the association relationship of the PON port.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
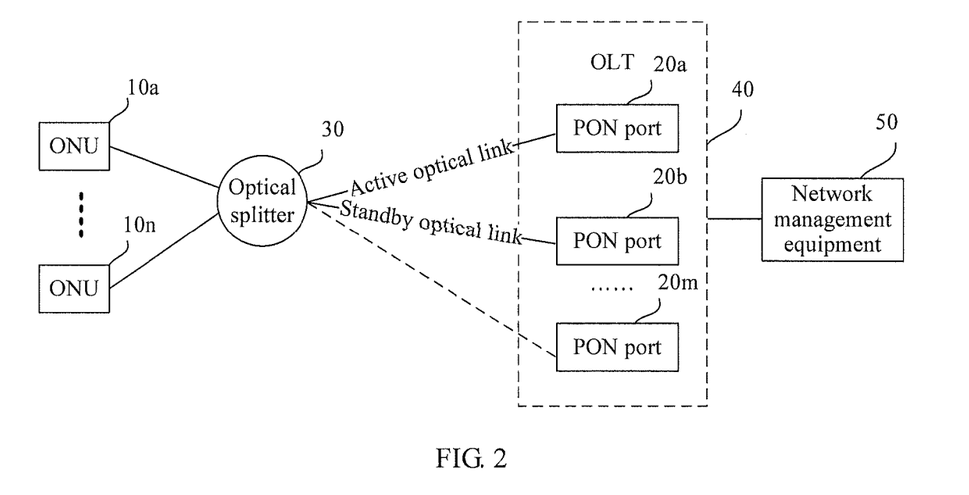
FIG. 2 is a schematic structural diagram of an optical network system according to an embodiment of the present invention.

FIG. 2 is a schematic structural diagram of an optical network system according to an embodiment of the present invention. ONU 10a to ONU 10n are connected to an optical splitter 30 through branch fibers. One optical splitter generally has only one optical link reaching an OLT. The present invention uses an N:2 configuration scheme where one optical splitter can have two links reaching an OLT. As shown in FIG. 2, the optical splitter 30 is connected, through a trunk fiber, to PON ports 20a and 20b on the OLT 40. The optical network system may further include a network management system 50. The OLT 40 is connected to the network management system 50, and the OLT 40 includes at least one OLT; the PON port 20a and the PON port 20b may be located on different OLTs or on a same OLT; when the PON port 20a and the PON port 20b are located on the same OLT, the OLT establishes a connection with the network management system 50; when the PON port 20a and the PON port 20b are located on different OLTs, the OLTs where the PON port 20a and the PON port 20b are located establish a connection with the network management system 50 respectively.

In this embodiment, the ONU includes various PON terminals, such as an ONU, an ONT, an MDU, and an MTU. Each ONU corresponds to an active PON port (working PON port) and a standby PON port (protection PON port) on the OLT side. Assuming that the PON port 20a is the active PON port of the ONU 10a on the OLT side, configuration information of the PON port 20a, such as GEMP Port, VLAN, and multicast rights table, is configured and stored on the network management system. The standby PON port of the ONU 10a on the OLT side may be configured at the beginning or be determined after a fiber link is established. The PON system in the present invention may be a GPON, an EPON, an XG-PON, a 10G-EPON, or another PON system.

Figure 3:
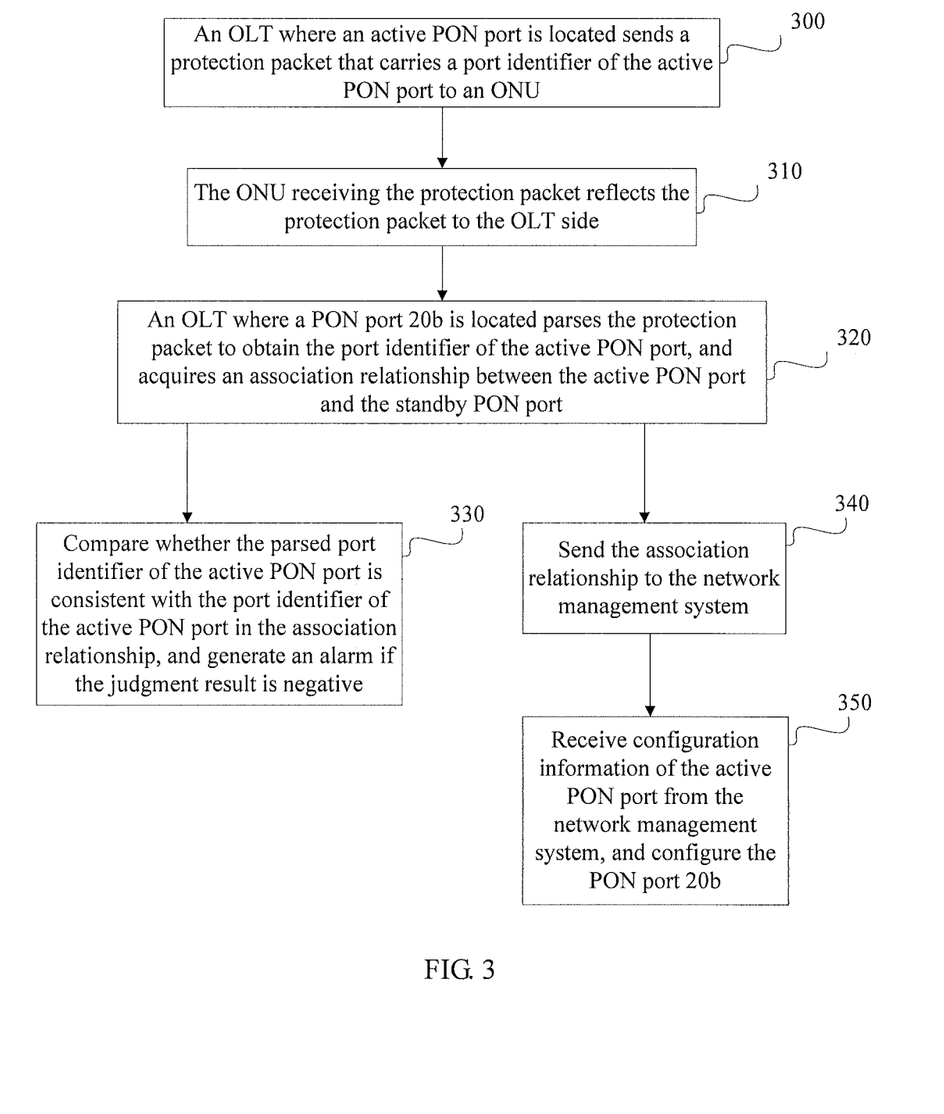
FIG. 3 is a schematic flowchart of a method for acquiring a PON port association relationship according to an embodiment of the present invention.

A method for configuring a PON port provided in an embodiment of the present invention is shown in FIG. 3, including the following steps:

300. An OLT where an active PON port is located sends an ONU, which is assumed to be an ONU 10a, a protection packet that carries a port identifier of the active PON port.

The protection packet may be specifically a GPON encapsulation method (GPON Encapsulation Method, GEM) packet that carries a specified GEM port ID or a packet that carries a specified logical link identity (Logical Link Identity, LLID). The port identifier of the active PON port may be carried by a user-defined data packet or be carried directly in a GEM Port packet header or an LLID packet header. In the embodiment of the present invention, a specific GEM port or a specific logical link LL may be pre-specified to transmit a protection packet. The protection packet further carries a protection mark used to enable the ONU 10a and the PON port receiving a packet reflected by the ONU 10a to identify that the packet is a protection packet and perform corresponding processing. When the protection packet is a GEM packet, the protection mark is an identifier of the pre-specified GEM port, that is, the GEM port ID; when the protection packet is an LLID packet, the protection mark is a specified logical link identity LLID.

In this embodiment, the port identifier of the PON port may be Access-Node-Identifier slot/port, where Access-Node-Identifier is an identifier of the OLT and slot/port is one of a chassis (chassis) number, a rack (rack) number, a frame (frame) number, a slot (slot), a sub-slot (sub-slot) number, and a port (port) number or any combination thereof. When the port identifier of the PON port is carried by the GEM Port or LL packet header, the port identifier can be encoded, so that the encoded port identifier can be placed in the packet header.

Carrying the port identifier of the PON port is a controllable function. When this function is enabled, the port identifier of the PON port is carried in the sent protection packet; when this function is disabled, the port identifier of the PON port is not carried in the sent protection packet.

The transmission of the protection packet that carries a PON port identifier may be completed automatically by an OLT where the PON port is located, or be triggered by the manager, for example, triggered by using a command line or by a network management system.

310. The ONU receiving the protection packet reflects the protection packet.

Specifically, after the ONU 10a receives the protection packet, the ONU 10a determines, according to the protection mark carried in the protection packet, that the packet is a protection packet, and then reflects the protection packet to the OLT side, which means the ONU 10a directly broadcasts the packet to the OLT side without modifying the packet. Because each ONU has two links connected to the OLT, the protection packet, after being reflected by the ONU, can reach the active PON port and one standby PON port, where the one standby PON port is assumed to be a PON port 20b. After the OLT where the active PON port is located receives the protection packet, it determines that the protection packet is sent by the OLT itself, and does not process the protection packet.

The foregoing step 300 and step 310 are not mandatory in the present invention. In the embodiment of the present invention, the protection packet received by the standby PON port may also be forged by an ONU that initiates an attack.

320. An OLT where the standby PON port, that is, the PON port 20b is located parses the protection packet to obtain the port identifier of the active PON port, and acquires an association relationship between the active PON port and the standby PON port that receive the protection packet. The association relationship between the active PON port and the standby PON port includes the port identifier of the active PON port and a port identifier of the standby PON port.

The acquiring an association relationship between the active PON port and the standby PON port in step 320 may be as follows: The OLT where the standby PON port is located generates the association relationship between the active PON port and the standby PON port according to the port identifier of the standby PON port and the port identifier of the active PON port in the protection packet. Assuming that the active PON port is a PON port 20a, the OLT generates an association relationship between the PON port 20a and the PON port 20b. In this case, this embodiment may further include step 340 and step 350.

The acquiring an association relationship between the active PON port and the standby PON port in step 320 may also be as follows: The OLT where the standby PON port is located searches, according to the port identifier of the standby PON port, an association relationship table locally stored, that is, stored on the OLT where the standby PON port is located, to acquire the pre-configured association relationship between the active PON port and the standby PON port. In this case, this embodiment further includes step 330.

Optionally, in this embodiment, the OLT where the standby PON port is located may send the acquired association relationship between the active PON port and the standby PON port to the network management system.

Through the foregoing steps, the OLT where the standby PON port is located may acquire the association relationship between the active PON port and the standby PON ports.

The embodiment of the present invention may further include the following steps:

330. The OLT where the standby PON port is located compares whether the parsed port identifier of the active PON port is consistent with the identifier of the active PON port in the association relationship between the active PON port and the standby PON port; if the judgment result is negative, the OLT generates an alarm. Assuming that the association relationship between the active PON port and the standby PON port pre-configured on the OLT where the PON port 20b is located indicates that the PON port 20a and the PON port 20b work in active/standby mode but a port identifier of a PON port 20m is parsed from the protection packet, the OLT where the standby PON port is located generates an alarm to announce a fiber link connection failure. The generating an alarm may be sending an alarm message. The alarm message may be sent to the network management system.

340. The OLT where the PON port 20b is located sends the generated association relationship between the PON port 20a and the PON port 20b to the network management system. Specifically, the OLT where the PON port 20b is located may send, over a network protocol such as RADIUS and DIAMETER, the association relationship to a network management server such as as an EMS and an NMS, or may send, over the Layer 2 Control Protocol (Layer2 Control Protocol, L2CP) or the Access Node Control Protocol (Access Node Control Protocol, ANCP), the association relationship to a network management equipment such as a network edge gateway BNG.

350. The network management system acquires, according to the association relationship between the active PON port and the standby PON port, configuration information of the active PON port, that is, configuration information of the PON port 20a, and sends the configuration information to the OLT where the PON port 20b is located; and the OLT where the PON port 20b is located configures the PON port 20b according to the configuration information. The configuration information may be configuration information stored in the network management system, or information stored on the OLT where the active PON port is located, such as MAC or IP binding information.

After the port configuration of the PON port 20b is completed, the PON port 20b becomes a standby PON port of the PON port 20a, and a standby link corresponding to the ONU 10a is established between the optical splitter 30 and the PON port 20b.

The port configuration mode in step 350 of the present invention may also use the following alternative implementation manner:

When the PON port 20a and the PON port 20b are located on one OLT, the network management system may be located on the OLT. After acquiring the port identifier of the PON port 20a from the protection packet, the OLT may copy configuration information of the PON port 20a to the PON port 20b, thereby implementing automatic configuration of the PON port 20b.

For the purpose of preventing the ONU from constructing a false protection packet and therefore causing the standby PON port to establish an incorrect association relationship, a shared key may also be configured on all OLTs in this embodiment. In this way, in step 300, the PON port identifier carried in the protection packet sent by the active PON port is a PON port identifier encrypted according to the shared key. In step 320, after the OLT where the PON port 20b is located receives the protection packet, the OLT decrypts, according to the shared key, the encrypted PON port identifier to obtain the port identifier of the active PON port.

Step 330 may further include: After the OLT where the PON port 20b is located receives the protection packet, decrypting, by the OLT according to the shared key, the encrypted port identifier of the active PON port, and if the obtained port identifier is the identifier of the PON port 20a, determining that a correct connection is established; otherwise, determining that an incorrect connection is established or a forged protection packet is received, and then generating an alarm, where the generating an alarm may be sending an alarm message to the network management system.

Figure 4:
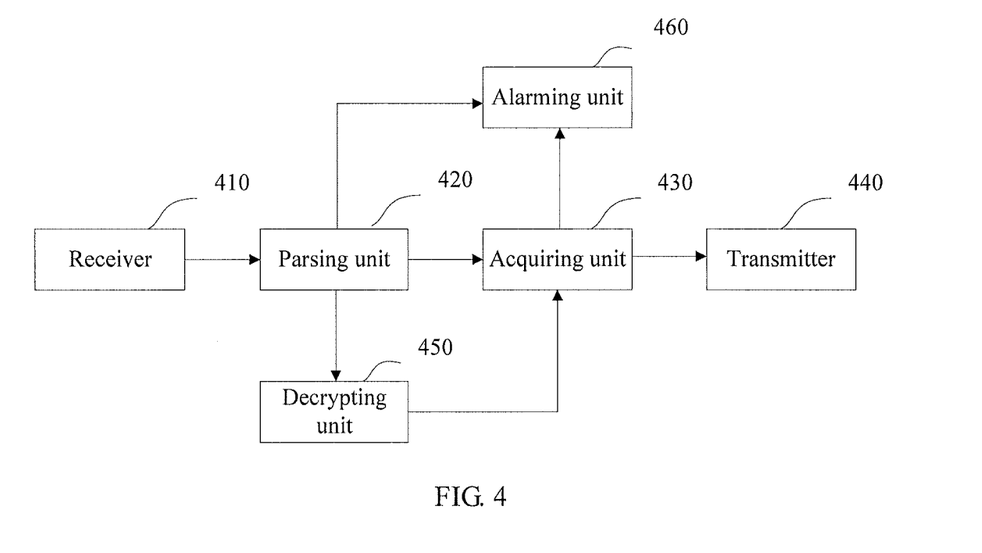
FIG. 4 is a schematic structural diagram of an optical network device according to an embodiment of the present invention.

When the optical network system provided in the embodiment of the present invention executes the foregoing method for acquiring a PON port association relationship, as shown in FIG. 4, the OLT where the standby PON port is located includes:

a receiver 410, configured to receive, through a standby PON port, a protection packet that carries a port identifier of an active PON port from an ONU;

a parsing unit 420, configured to parse the protection packet received by the receiver 410 to obtain the port identifier of the active PON port carried in the protection packet; and an acquiring unit 430, configured to acquire an association relationship between the active PON port and the standby PON port according to a port identifier of the standby PON port receiving the protection packet. For details of the acquiring process, reference may be made to the description of step 320.

The OLT may further include a memory (not shown in FIG. 4) configured to store a mapping table of association relationships between PON ports on the OLT.

Optionally, the OLT may further include one or more of a transmitter 440, an alarming unit 460, and a decrypting unit 450, where: the transmitter 440 is configured to send the association relationship between the active PON port and the standby PON port acquired by the acquiring unit 430 to a network management system.

In this case, the receiver 410 may be further configured to receive configuration information of the active PON port which is sent by the network management system according to the association relationship between the active PON port and the standby PON port, and configure the standby PON port according to the configuration information of the active PON port.

The alarming unit 460 is configured to judge whether the port identifier of the active PON port carried in the protection packet and parsed by the parsing unit 420 is consistent with the port identifier of the active PON port in the association relationship between the active PON port and the standby PON port acquired by the acquiring unit 430, and generate an alarm when the judgment result is negative. The generating an alarm may be sending an alarm message, where the alarm message may be sent to the network management system.

The decrypting unit 450 is configured to decrypt, according to a shared key, the encrypted port identifier obtained by the parsing unit to obtain the port identifier of the active PON port, and send the port identifier of the active PON port to the acquiring unit 430.

Figure 5:
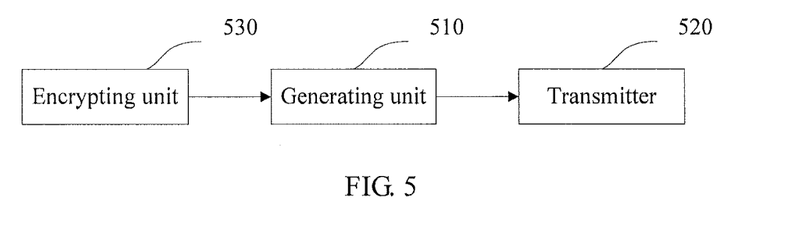
FIG. 5 is a schematic structural diagram of another optical network device according to an embodiment of the present invention.

When the optical network system provided in the embodiment of the present invention executes the foregoing method for acquiring a PON port association relationship, as shown in FIG. 5, the OLT where the active PON port is located includes:

a generating unit 510, configured to generate a protection packet, where the protection packet carries a port identifier of an active PON port; and a transmitter 520, configured to send the protection packet to an ONU.

When a shared key is configured on the OLT, the OLT further includes:

an encrypting unit 530, configured to encrypt the port identifier of the active PON port and send the encrypted port identifier of the active PON port to the generating unit 510.

When the OLT where the active PON port is located and the OLT where the standby PON port is located are the same, the OLT may include some or all function units illustrated in FIG. 4 and FIG. 5 as required, and may further include a copying unit (not shown in FIG. 4 and FIG. 5) configured to copy configuration information of the active PON port to the standby PON port when the standby PON port receives the protection packet.

Figure 6:
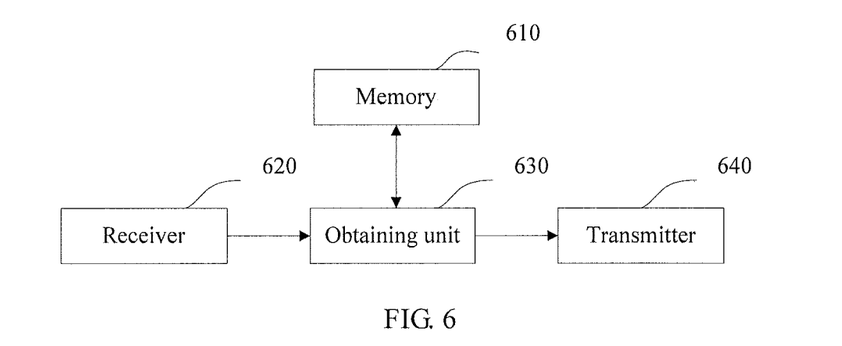
FIG. 6 is a schematic structural diagram of a network management system according to an embodiment of the present invention.

When the optical network system has only one OLT, the network management system 50 may be located on the one OLT; when the optical network system has a plurality of OLTs, the network management system 50 may be set separately, and each OLT is connected to the network management system 50. As shown in FIG. 6, the network management system 50 may include:

a memory 610, configured to store a configuration information base, where the configuration information base includes configuration information of an active PON port;

a receiver 620, configured to receive an association relationship between the active PON port and a standby PON port which is sent by an OLT where the standby PON port is located.

an acquiring unit 630, configured to acquire configuration information of the active PON port according to the association relationship between the active PON port and the standby PON port received by the receiver 620, where the acquiring configuration information of the active PON port may be searching, according to the association relationship between the active PON port and the standby PON port, the configuration information base stored in the memory 610 for configuration information of the active PON port, and may be sending a request message to the OLT where the active PON port is located, and receiving configuration information of the active PON port from the OLT; and a transmitter 640, configured to send the configuration information of the active PON port to the OLT where the standby PON port is located.

In the foregoing embodiment of the present invention, when an OLT where a standby PON port is located receives a packet from an ONU through the standby PON port, the OLT acquires an association relationship between an active PON port and the standby PON port, and can perform subsequent processing according to the association relationship between the active PON port and the standby PON port. For example, configuration information of the active PON port is acquired according to the association relationship, and the standby PON port is configured by using the configuration information of the active PON port. This can avoid a defect that after configuration of the active PON port and the standby PON port is completed, a standby optical link cannot be formed due to an incorrect fiber connection. In another example, if an OLT where the standby PON port is located pre-configures an association relationship between the active PON port and the standby PON port, the standby PON port may generate an alarm when a fiber is incorrectly connected or when receiving a packet maliciously forged by the ONU, that is, when finding that the received port identifier of the active PON port is inconsistent with the configured port identifier of the active PON port, so that a builder can modify the incorrect fiber connection in a timely manner or the system can perform corresponding processing.

A person of ordinary skill in the art may understand that all or a part of the steps of the foregoing method embodiments may be implemented by a program instructing relevant hardware. The foregoing programs may be stored in a computer readable storage medium. When the program runs, the foregoing steps of the method embodiments are performed. The foregoing storage medium includes various mediums capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments, or make equivalent replacements to some technical features thereof, without departing from the spirit and scope of the technical solutions of the embodiments of the present invention.

What is claimed is:

1. A method for obtaining a PON port mapping relationship, comprising:

receiving, through a standby PON port, a protection packet that carries a port identifier of active PON port from an optical network unit ONU;

parsing the protection packet to obtain the port identifier of the active PON port carried in the protection packet; and acquiring an association relationship between the standby PON port and the active PON port according to a port identifier of the standby PON port receiving the protection packet.

2. The method according to claim 1, further comprising:

sending the association relationship between the active PON port and the standby PON port to a network management system;

receiving configuration information of the active PON port which is sent by the network management system according to the association relationship between the active PON port and the standby PON port; and configuring the standby PON port according to the configuration information of the active PON port.

3. The method according to claim 1, wherein when the port identifier of the active PON port carried in the protection packet is a port identifier encrypted according to a shared key, the method further comprises:

decrypting the port identifier of the active PON port according to the shared key.

4. The method according to claim 1, wherein the acquiring an association relationship between the active PON port and the standby PON port according to the port identifier of the standby PON port receiving the protection packet comprises:
searching, according to the port identifier of the standby PON port, a locally stored association relationship table to obtain the association relationship between the active PON port and the standby PON port; or
generating the association relationship between the active PON port and the standby PON port according to the port identifier of the active PON port and the port identifier of the standby PON port.

5. The method according to claim 4, wherein when the locally stored association relationship table is searched according to the port identifier of the standby PON port to obtain the association relationship between the active PON port and the standby PON port, the method further comprises:
generating an alarm when the port identifier of the active PON port carried in the protection packet is inconsistent with the port identifier of the active PON port in pre-configured association relationship.

6. The method according to claim 1, wherein:
the protection packet is a GPON encapsulation method (GEM) packet that carries a specified GEM port ID or a packet that carries a specified logical link identity LLID.

7. An optical network device, comprising:
a receiver, configured to receive, through a standby PON port, a protection packet that carries a port identifier of an active PON port from an optical network unit ONU;
a parsing unit, configured to parse the protection packet received by the receiver to obtain the port identifier of the active PON port carried in the protection packet; and
an acquiring unit, configured to acquire an association relationship between the active PON port and the standby PON port according to a port identifier of the standby PON port receiving the protection packet.

8. The optical network device according to claim 7, further comprising:
a transmitter, configured to send the association relationship between the active PON port and the standby PON port acquired by the acquiring unit to a network management system; wherein:
the receiver is further configured to receive configuration information of the active PON port which is sent by the network management system according to the standby PON port, and configure the standby PON port according to the configuration information of the active PON port.

9. The optical network device according to claim 7, further comprising:
a decrypting unit, configured to decrypt, according to a shared key, the encrypted port identifier obtained by the parsing unit to obtain the port identifier of the active PON port, and send the port identifier of the active PON port to the acquiring unit.

10. The optical network device according to claim 7, wherein the acquiring unit is specifically configured to:
search a locally stored association relationship table according to the port identifier of the standby PON port to obtain the association relationship between the active PON port and the standby PON port; or
generate the association relationship between the active PON port and the standby PON port according to the port identifier of the active PON port and the port identifier of the standby PON port.

11. The optical network device according to claim 10, wherein when the acquiring unit generates the association relationship between the active PON port and the standby PON port according to the port identifier of the active PON port and the port identifier of the standby PON port, the optical network device further comprises:
an alarming unit, configured to judge whether the port identifier of the active PON port obtained by the parsing unit and carried in the protection packet is consistent with the port identifier of the active PON port in the association relationship between the active PON port and the standby PON port acquired by the acquiring unit, and generate an alarm when the judgment result is negative.

12. An optical network system, comprising an optical network unit ONU and a first optical line terminal OLT, wherein:
the ONU is configured to send a protection packet that carries a port identifier of an active PON port to the first OLT; and
the first OLT is configured to receive the protection packet through a standby PON port, parse the protection packet to obtain the port identifier of the active PON port carried in the protection packet, and acquire an association relationship between the active PON port and the standby PON port according to the port identifier of the standby PON port receiving the protection packet.

13. The optical network system according to claim 12, further comprising a network management system; wherein the first OLT is further configured to:
send the association relationship between the active PON port and the standby PON port to the network management system; receive configuration information of the active PON port which is sent by the network management system according to the association relationship between the active PON port and the standby PON port; and configure the standby PON port according to the configuration information of the active PON port; and
wherein the network management system is configured to acquire the configuration information of the active PON port according to the association relationship between the active PON port and the standby PON port, and send the configuration information of the active PON port to the optical line terminal.

14. The optical network system according to claim 13, further comprising a second OLT, wherein the network management system being configured to acquire the configuration information of the active PON port according to the association relationship between the active PON port and the standby PON port comprises:
searching, according to the association relationship between the active PON port and the standby PON port, a locally stored configuration information base for the configuration information of the active PON port; or
sending a request message to the second OLT, and receiving the configuration information of the active PON port from the second OLT; wherein: the second OLT is an OLT where the active PON port is located.

* * * * *

UNITED STATES PATENT AND TRADEMARK OFFICE
CERTIFICATE OF CORRECTION

| | | |
|---|---|---|
| PATENT NO. | : 9,083,465 B2 | Page 1 of 1 |
| APPLICATION NO. | : 14/146966 | |
| DATED | : July 14, 2015 | |
| INVENTOR(S) | : Weiping Xu et al. | |

It is certified that error appears in the above-identified patent and that said Letters Patent is hereby corrected as shown below:

On the Title Page

Second Page, Column 2, Line 16 (Other Publications):

Delete "ITU-T6984.1" and insert --ITU-T G.984.1--

Signed and Sealed this
Thirteenth Day of October, 2015

Michelle K. Lee
*Director of the United States Patent and Trademark Office*